(12) United States Patent
Baurmeister et al.

(10) Patent No.: US 6,214,232 B1
(45) Date of Patent: Apr. 10, 2001

(54) MEMBRANE MODULE WITH LAYERED HOLLOW-FIBER MEMBRANES

(75) Inventors: Ulrich Baurmeister, Wuppertal; Rudolf Wollbeck, Erlenbach, both of (DE)

(73) Assignee: Akzo Nobel NV, Postbus (NL)

( * ) Notice: Subject to any disclaimer, the term of this patent is extended or adjusted under 35 U.S.C. 154(b) by 0 days.

(21) Appl. No.: 09/308,535

(22) PCT Filed: Dec. 17, 1997

(86) PCT No.: PCT/EP97/07083

§ 371 Date: Jun. 25, 1999

§ 102(e) Date: Jun. 25, 1999

(87) PCT Pub. No.: WO98/28064

PCT Pub. Date: Jul. 2, 1998

(30) Foreign Application Priority Data

Dec. 21, 1996 (DE) .............................. 196 53 883

(51) Int. Cl.⁷ .................................. B01D 15/08
(52) U.S. Cl. .................. 210/651; 210/805; 210/321.75; 210/321.76; 210/321.79; 210/321.8; 210/321.84; 210/321.85; 210/321.89; 210/500.23
(58) Field of Search ............................ 210/198.2, 321.74, 210/321.75, 321.76, 321.79, 321.8, 321.83, 321.84, 321.85, 321.89, 500.23, 651, 656, 805; 436/531, 532, 535; 530/810, 812, 815, 816, 817

(56) References Cited

U.S. PATENT DOCUMENTS

| | | |
|---|---|---|
| 4,061,141 | 12/1977 | Hyden et al. |
| 4,266,026 | 5/1981 | Breslau |
| 4,784,768 | * 11/1988 | Mathieu |

(List continued on next page.)

FOREIGN PATENT DOCUMENTS

| | | |
|---|---|---|
| 28 42 835 A1 | 4/1980 | (DE) |
| 30 22 313 A1 | 12/1980 | (DE) |
| 33 02 384 A1 | 7/1984 | (DE) |

(List continued on next page.)

OTHER PUBLICATIONS

E. Klein, Affinity Membranes: Their Chemistry and Performance in Adsorptive Separation Processes, John Wiley & Sons, Inc., (1991).

S. Brandt et al., Membrane–Based Affinity Technology For Commercial Scale Purifications, Bio/Technology, vol. 6, pp. 779–782 (Jul. 1988).

K. Sakai, Determination of Pore Size and Pore Size Distribution: 2. Dialysis Membranes, Journal of Membrane Science 96, pp. 91–130, (1994).

(List continued on next page.)

*Primary Examiner*—Joseph W. Drodge
*Assistant Examiner*—David Sorkin
(74) *Attorney, Agent, or Firm*—Oliff & Berridge, PLC

(57) ABSTRACT

An apparatus and process for substance-specific treatment of fluids, whereby the apparatus comprises a housing with a distribution space and a collection space, between which is arranged a structure of adjacent flat first and second layers containing first and second hollow-fiber membranes, respectively, and a matrix on which groups acting in a substance-specific manner for fluid treatment are immobilized, whereby the filling ratio $\epsilon$ of the housing determined by the hollow-fiber membranes and the matrix is greater than 0.55. The first hollow-fiber membranes are open in the direction of the distribution space and closed in the direction of the collection space, and the second hollow-fiber membranes are open in the direction of the collection space and closed in the direction of the distribution space, and the hollow fiber membranes are embedded at least at their open end in the sealing compounds. The layers contained in the apparatus are substantially of equal thickness, and each first layer is, on at least one of its sides, adjacent to a second layer and each second layer is, on at least one of its sides, adjacent to a first layer.

37 Claims, 7 Drawing Sheets

U.S. PATENT DOCUMENTS

| | | |
|---|---|---|
| 4,935,142 | 6/1990 | Sternberg . |
| 4,940,617 * | 7/1990 | Baurmeister . |
| 5,019,270 | 5/1991 | Afeyan et al. . |
| 5,516,691 | 5/1996 | Gerlach . |
| 5,693,230 | 12/1997 | Asher . |

FOREIGN PATENT DOCUMENTS

| | | |
|---|---|---|
| 37 09 432 A1 | 10/1988 | (DE) . |
| 195 01 726 A1 | 7/1996 | (DE) . |
| 0 138 060 A2 | 4/1985 | (EP) . |
| 0 173 500 A1 | 3/1986 | (EP) . |
| 0 254 100 A2 | 1/1988 | (EP) . |
| 0 285 812 A1 | 10/1988 | (EP) . |
| 0 354 061 A2 | 2/1990 | (EP) . |
| 0 490 940 B1 | 6/1992 | (EP) . |
| 0 565 978 A1 | 10/1993 | (EP) . |
| 0 610 755 A1 | 8/1994 | (EP) . |
| WO 90/04609 | 5/1990 | (WO) . |
| WO 90/05018 | 5/1990 | (WO) . |

OTHER PUBLICATIONS

S. Nakao, Determination of Pore Size and Pore Size Distribution: 3. Filtration Membranes, Journal of Membrane Science 96, pp. 131–165, (1994).

L. Zeman, Characterization of Microfiltration Membranes By Image Analysis of Electron Micrographs: Part I. Method Development, Journal of Membrane Science 71, pp. 221–231, (1992).

K. Kaneko, Determination of Pore Size and Pore Size Distribution: 1. Adsorbents and Catalysts, Journal of Membrane Science 96, pp. 59–89, (1994).

W. Müller, New Ion Exchangers for the Chromatography of Biopolymers, Journal of Chromatography 510, pp. 133–140, (1990).

S. Tsuneda et al., Binding of Lysozyme onto a Cation–Exchange Microporous Membrane Containing Tentacle–Type Grafted Polymer Branches, Biotechnol. Prog., 10, pp. 76–81, (1994).

S. Tsuneda et al., High–throughout Processing of Proteins Using a Porous and Tentacle Anion–Exchange Membrane, Journal of Chromatography A, 689, pp. 211–218, (1995).

Ullmann's Encyclopedia of Industrial Chemistry, $4^{th}$ Edition, vol. 10, pp. 475–561, Verlag Chemie, Weinheim 1975.

* cited by examiner

MEMBRANE MODULE WITH LAYERED HOLLOW-FIBER MEMBRANES

BACKGROUND OF THE INVENTION

The invention relates to an apparatus for substance-specific treatment of a fluid, comprising a) a housing, b) an inlet arrangement, connected to a distribution space, for introducing the fluid to be treated into the housing c) an outlet arrangement, connected to a collection space, for removing the treated fluid from the housing, and d) an arrangement of first hollow-fiber membranes and second hollow-fiber membranes, whereby the hollow-fiber membranes are substantially parallel to each other and the hollow-fiber membranes have an end facing the distribution space and an end facing the collection space, whereby the first hollow-fiber membranes have cavities formed by their walls, open in the direction of the distribution space and closed in the direction of the collection space, and at least at the end facing the distribution space are embedded in a sealing compound that is joined in a fluid-tight manner with the wall of the housing, and whereby the second hollow-fiber membranes have cavities formed by their walls, open in the direction of the collection space and closed in the direction of the distribution space, and at least at the end facing the collection space are embedded in a sealing compound that is joined in a fluid-tight manner to the wall of the housing.

Substance-specific treatments of fluids are becoming increasingly significant for applications such as biotechnology, medicine, or chemical technology. Fluids include gases, gas mixtures, and generally liquids such as protein solutions, prefiltered suspensions, and clear solutions. An example of substance-specific treatment is the extraction of active agents from cell suspensions in which genetically modified cells have generated substances such as antibodies, hormones, growth factors, or enzymes, usually in small concentrations. Other important applications are the extracorporeal removal of undesired substances from human blood plasma and extraction of components such as immunoglobulins or clotting factors from the plasma of donated blood. Finally, another broad application area is the catalytic or biocatalytic—enzymatic—treatment of liquids, such as the hydrolysis of oils by lipases immobilized in a matrix.

The substance-specific treatment of fluids is frequently conducted such that the fluid to be treated is brought into contact with a carrier material, on and/or in which interacting groups or substances are immobilized that, in a specific, selective manner, interact with the target substance contained in the fluid, i.e., with the substance that is the object of the substance-specific treatment. Such interactions can be, for example, cationic or anionic exchange, hydrophilic/hydrophobic interaction, hydrogen bridge formation, affinity, or enzymatic or catalytic reactions, and the like. In affinity separation, such as affinity chromatography, ligands are coupled to or immobilized in the carrier material and have the function of adsorptively binding a specific single target substance or an entire class of substances. This target substance is termed a ligate. One example of class-specific ligands are positively charged diethylaminoethyl (DEAE) groups or negatively charged sulfonic acid ($SO_3$) groups, which adsorb the class of positively charged or negatively charged molecules, respectively. Specific ligands are, for example, antibodies against a certain protein, which is bound as a ligate to the antibody.

The major criteria in the substance-specific treatment of fluids are productivity and selectivity. With a view toward productivity, it is important that, per unit of volume, as many groups as possible are available that act in a substance-specific manner and can interact with the target substance contained in the fluid to be treated. At the same time, it is desirable to maximize the transport of the target substance to the groups or substances acting in a substance-specific manner.

One carrier material for ligands that is frequently employed in affinity chromatography is sepharose particles, which are present in bulk form in a chromatographic column. Even if a high concentration of ligands, with high selectivity, can be realized in this case, the productivity is known to be low due to the high pressure drops of the particle column and the compressibility of the sepharose particles. Furthermore, the access of the ligates to the ligands contained in the sepharose particles is diffusion controlled, which results in long residence times and thus low throughput and productivity, in particular when separating larger molecules such as proteins, due to their low diffusion rates. Improved chromatographic column materials are described in U.S. Pat. No. 5,019,270. These consist of rigid, porous particles through which convective flow is possible. As a result of the convective substance transport through the particles and the non-compressibility, reduced residence time and increased productivity are possible compared to the previously mentioned column material.

While it is an advantage of chromatographic columns filled with such particles that their construction and use are simple, they have a number of disadvantages, one of which, aside from those discussed for sepharose particles, is that, particularly with larger-diameter chromatographic columns, the flow through the bulk particle material is not uniform, having a negative effect with respect to the uniform use of all the ligands present in the chromatographic column. Furthermore, technical control of the pressure required becomes increasingly complex as the diameters increase.

The cited disadvantages of particle-shaped carrier materials led to the development of a number of methods for substance-specific treatment of fluids, in which membranes with a porous structure are used as carrier materials for interacting groups. Due to their porous structure, membranes present a large inner surface area, so that a large number of functional groups can be coupled to the membrane, in high concentration per volume unit, which can interact with the fluids to be treated passing through the membrane (see, for example, E. Klein, "Affinity Membranes", John Wiley & Sons, Inc., 1991; S. Brandt et al., "Membrane-Based Affinity Technology for Commercial Scale Purifications", Bio/Technology Vol. 6 (1988), pp. 779–782).

Adaptation to the requirements of the treatment method can be attained via the type of the membrane used. Membranes are available in the form of hollow fibers or as flat membranes made from a wide variety of materials, so that adaptation to the physico-chemical properties of the fluids to be treated is possible. In addition, the pore size of the membranes can be adjusted such that a fluid to be treated, containing a target substance, for example, can pass through the membrane convectively, and—in the case of binding of the target substance to the interacting groups—there is no blockage of the membrane.

For a given linear flow rate, the thickness of the membrane wall can influence the residence time in the membrane of the fluid to be treated and the pressure drop during flow. Due to the generally thin walls (<300 $\mu$m, for example), membranes are distinguished by short transport distances of the fluid to be treated to interacting groups immobilized in the membranes, for example, resulting in relatively short residence times, low pressure drops, high linear flow rates, and thus high binding rates.

A number of apparatus containing such membranes have been described that are used in processes for substance-specific treatment of fluids. In this case, a distinction must be drawn between so-called dead-end mode or dead-end modules and cross-flow mode or cross-flow modules.

In the cross-flow mode, the fluid to be treated flows as a feed stream parallel to one side of the membrane, and a portion of the feed stream passes as a permeate through the membrane. Thus, in cross-flow modules, it is always only a portion of the liquid to be treated that passes through the membrane, namely the portion that passes through the membrane wall as a permeate and can be subjected to the substance-specific treatment, which generally takes place in the membrane wall or in the space enclosing the membrane. Therefore, the efficiency of these cross-flow modules is limited with respect to the substance-specific treatment.

In dead-end mode, on the other hand, the entire fluid entering the membrane module as a feed stream is directed through the membrane and removed as a filtrate or permeate from the downstream side of the membrane opposite the upstream side.

In U.S. Pat. No. 4,935,142, an apparatus containing a stack of flat membranes is described for conducting an affinity separation process in dead-end mode. Coupled to the flat membranes are ligands to which the ligates to be separated from the liquid to be treated are bound. The number of flat-membrane layers constituting the stack and thus the membrane surface area depend on the required capacity of the apparatus and its permissible pressure drop. The flat membranes constituting the membrane stack must be sealed off from the surrounding housing in order to force flow through the membrane stack. Such a structure is unfavorable from the standpoint of scaling-up, since providing a sufficiently large membrane surface area of the stack requires a large number of flat membranes, resulting in a high pressure drop during flow through the stack. Increasing the diameter of the flat membrane layers, however, requires additional measures to be taken to ensure uniform distribution of the fluid to be treated across the membrane layers and provide the flat-membrane elements and the housing with sufficient stability with respect to the resulting pressure.

In EP-A-0 173 500, devices are also described for use in membrane-based affinity separation methods such as isolation of immunoglobulins, antibodies, etc. These devices or membrane modules contain microporous flat membranes folded in a star-shape. The flat membranes folded in a star-shape are supported between two coarse meshes and positioned between two coaxially arranged cylinder-shaped housing elements. According to EP-A-0 610 755, with the same construction of the devices as described in EP-A-0 173 500, a plurality of flat membranes folded in a star-shape are arranged concentrically to each other in the housing in order to increase the membrane surface area, make the flow more uniform, and prevent the target substances from breaking through.

In the cited devices, the fluid to be treated is fed through the module by applying pressure from the inside to the outside, or vice-versa, and flows through the membrane in dead-end mode. Compared to modules with unfolded membranes arranged concentrically to each other, the cited modules offer the advantage of a relatively larger membrane surface area with comparatively lower pressure loss. However, generally only low filling ratios, defined as the ratio of the volume of the membranes to the total module volume, are possible.

DE-A-33 02 384 describes a dead-end module for blood plasma treatment containing hollow-fiber membranes. This module contains two hollow-fiber-membrane bundles, connected in series and arranged next to one another, by means of which pathological plasma molecules are separated from the blood plasma by size fractionation. The ends of the hollow-fiber membranes of the two membrane bundles are embedded together in the module housing such that the hollow-fiber membranes of the first membrane bundle are open at their ends toward the module inlet and closed at their other ends, while the hollow-fiber membranes of the second membrane bundle are open at the module outlet and closed at the other end. The open ends of the two hollow-fiber bundles are therefore arranged oppositely. During operation, the blood plasma from which the pathogenic components are to be filtered flows in dead-end mode initially via the open ends of the hollow-fiber membranes of the first membrane bundle into the lumen of these membranes and through their walls into the extraluminal region. Once filtered in this manner, the plasma then flows from the outside to the inside into the lumen of the hollow-fiber membranes of the second membrane bundle and leaves them through their open ends. Through the design and adjacent arrangement of the bundles in accordance with DE-A-33 02 384, however, defined flows of the fluid to be treated from the hollow-fiber membranes of the first membrane bundle to the hollow-fiber membranes of the second membrane bundle cannot be realized, and high filling ratios, i.e. high ratios of the volume of the hollow-fiber membranes, with respect to their outside diameter, to the volume of the housing cannot be achieved.

In DE-A-37 09 432, a dead-end module is disclosed for sterilization of liquid media, the module having two hollow-fiber-membrane bundles connected in series and arranged next to one another, and having a construction similar to that described in DE-A-33 02 384. In the module of DE-A-37 09 432, the membrane of at least one of the hollow-fiber bundles can have adsorptive substances. Moreover, the bundles can be enclosed by an additional filtration device in the form of a semi-permeable flexible tube, whereby this filtration device can also have adsorptive substances.

Many dead-end modules have the common disadvantages that the distribution of the fluid to be treated to the membrane surface is to a great extent non-uniform in the case of large-volume constructions, that either the pressure drops are too high or the filling ratios and thus the capacity per filling volume are too low. Moreover, the application of these prior-art membrane modules is relatively inflexible to the extent that their use generally allows only a single substance-specific fluid treatment to be conducted.

It is therefore an object of the invention to provide an apparatus of the type initially described for substance-specific treatment of fluids, which is operated in dead-end mode and in which the cited disadvantages in the prior art are at least reduced, and which is easy to manufacture. In particular, a controlled flow of the fluid to be treated from the first to the second hollow-fiber membranes in the apparatus should take place. Furthermore, the apparatus should be flexibly adaptable to the respective fluid treatment and in particular enable different substance-specific treatments simultaneously and/or different substance-specific treatments consecutively.

It is furthermore an object of the invention to provide a process for efficient substance-specific treatment of fluids using semi-permeable membranes with porous structure, wherein the cited disadvantages are at least reduced.

The object is achieved by an apparatus in accordance with the preamble of Claim 1 wherein the first hollow-fiber membranes are arranged in at least one flat first layer of adjacent first hollow-fiber membranes and the second hollow-fiber membranes are arranged in at least one flat second layer of adjacent second hollow-fiber membranes, wherein each first layer is adjacent, on at least one of its sides and over substantially the entire extent of its surface, to a second layer, and each second layer is adjacent, on at least one of its sides and over substantially the entire extent of its surface, to a first layer, wherein the first and second layers have substantially the same thickness, wherein the housing contains a matrix on and/or in which substance-specific groups are immobilized, and wherein the filling ratio $\epsilon$ of the housing is greater than 0.55.

The object is furthermore achieved by a process for substance-specific treatment of a fluid, the process comprising at least the steps of:

a) Introduction of the fluid to be treated via the inlet arrangement of the housing into the distribution space connected to the inlet arrangement, b) Passing of the fluid from there into the cavities of the first hollow-fiber membranes and through the walls of the first hollow-fiber membranes, c) Passing of the fluid out of the walls of the first hollow-fiber membranes, d) Passing of the fluid into and through the walls of the second hollow-fiber membranes, e) Passing of the fluid out of the walls of the second hollow-fiber membranes into their cavities, f) Passing of the fluid into the collection space, and g) Removal of the fluid from the housing via the outlet arrangement, whereby the fluid on the way from the distribution space to collection space flows through the matrix on and/or in which substance-specific groups are immobilized, and whereby the substance-specific treatment of the fluid takes place as it passes through the matrix, and in which process the apparatus according to the invention is used.

Fluids to be treated in the context of the present invention are understood to be those fluids that contain specific substances or target substances that are the target of the substance-specific treatment. The filling ratio $\epsilon$ is defined as the ratio of the sum of the volumes of the first and second hollow-fiber membranes and the matrix, in each case with respect to their outside diameters, to the volume of the housing delimited by the housing inner wall and the sealing compounds. The filling ratio is preferably greater than 0.7.

Through the design of the apparatus according to the invention for the substance-specific treatment of fluids, in particular the layered arrangement of the first and second hollow-fiber membranes and their high filling ratios, it is possible compared to prior-art apparatus to achieve a high volume density of the substance-specific groups contained in the housing. Likewise, a defined, and with respect to the housing cross- and longitudinal sections, uniform and controllable flow from the first to the second hollow-fiber membranes is realized, so that channel formation, dead space, etc., are at least substantially avoided. As a result, there is uniform utilization of the substance-specific groups present in high volume density. For this reason, the apparatus according to the invention are distinguished by compact construction. At the same time, it is possible to scale-up the apparatus according to the invention in a simple manner: due to the design of this apparatus, a scaling-up can be readily attained by simply increasing the dimensions of the first and second layers in the direction of the extent of the hollow-fibers and perpendicularly thereto and/or by increasing the number of layers, without significantly impairing the flow conditions in the apparatus or the uniformity of utilization of the substance-specific groups.

Preferably, the first and second hollow-fiber membranes are advantageously bound into at least one hollow-fiber mat respectively, in turn forming the first and/or second layers. The hollow-fiber membranes are preferably incorporated into these hollow-fiber mats using textile threads. Using known methods, such mats can be advantageously produced as knitted mats, woven mats, or small woven ribbons, or also as crocheted mats. In the case of weaving or knitting, the textile threads are the woven or warp threads running transversely to the hollow-fiber membranes. These transverse threads hold the hollow-fiber membranes in an arrangement such that they are substantially parallel to one another.

Layers of first and second hollow-fiber membranes can be generated, for example, from meander-form woven or knitted hollow-fiber membrane mats on whose side edges the hollow-fiber membranes form an arch and for this reason are initially closed at these edges. By cutting off the end arch at one edge of such a mat, the hollow-fiber membranes can be opened on one side. Preferably, however, such a meander-form woven or knitted mat of hollow-fiber membranes is divided in the middle, so that two halves with hollow-fiber membranes are generated whose cavities are open on one side. After superimposing the two halves, a mat arrangement is obtained in a simple manner with two layers in which the open ends of the hollow-fiber membranes lie on opposite sides, i.e. a two-layer arrangement results with a first and second layer. After subsequent embedding of the ends in the sealing compound, the initially still open ends are sealed by the sealing compound, whereas the initially closed ends at the end arches become open ends after embedding and subsequent cutting.

In accordance with a further embodiment of the invention, the hollow-fiber membranes are incorporated into the respective hollow-fiber mat using flat, preferably strip-shaped connecting elements. Such strip-shaped connecting elements can run perpendicularly, but also at other angles, to the hollow-fiber membranes, which run parallel to one another, and can be laminated to them using, for example, a polyurethane-based adhesive applied pointwise.

Preferably, the hollow-fiber mats exhibit a low transverse elongation, where transverse elongation is understood to be the elongation of the hollow-fiber mats transverse to the extent of the hollow-fiber membranes, i.e., with respect to the mat width. This avoids undesirable separations, occurring during processing of the hollow-fiber mats, between the hollow-fiber membranes within each mat, which can have a negative effect with respect to the high filling ratios required by the invention. Preferably, the hollow-fiber mats are constructed such that their transverse elongation is less than 1% when subjected to a transverse stress of 12 cN per cm of mat width.

Preferably, the apparatus according to the invention contains at least three layers. In a preferred embodiment, the arrangement of the first and second hollow-fiber membranes consists of flat first layers and flat second layers that are superimposed to form a stack. In a further preferred embodiment of the apparatus according to the invention, the hollow-fiber mats, which each contain first or second hollow-fiber membranes, are superimposed and then folded with each other in a zigzag pattern to form a stack. A likewise preferred embodiment of the apparatus according to the invention includes an arrangement of first and second layers that are wound spirally around a winding axis parallel to the hollow-fiber membranes. The winding axis can be a winding core or a flat axis, i.e., a winding plane.

As previously mentioned, the first and second hollow-fiber membranes are, in accordance with the invention, arranged in flat first and second layers. A flat layer is understood to be a layer whose dimensions in the plane state, i.e., prior to spiral winding, for example, in the longitudinal direction of the hollow-fiber membranes and in one direction perpendicular to the hollow-fiber membranes are considerably greater than in the remaining, second direction perpendicular to the hollow-fiber membranes that determines the thickness of the layer. Preferably, the hollow-fiber membranes in the first and second layers, respectively, lie next to each other in a plane, i.e., the midpoints of the cross-sections of the hollow-fiber membranes can be connected by a straight or spirally shaped line.

First layers adjacent to the housing inner wall have, in accordance with the invention, a second layer on the side away from the housing inner wall, and second layers adjacent to the housing inner wall correspondingly a first layer. The requirement that each first layer be adjacent to a second layer on at least one side and each second layer be adjacent to a first layer on at least one side means that a layer of the same type can again be adjacent to the respective other side of the layer in question. In this manner, two layers of the same type, i.e. two first or two second layers, can be adjacent to one another, but a layer of the other type must be adjacent to them.

The arrangement of the first and second hollow-fiber membranes is preferably made from first and second layers such that it has an alternating sequence of first and second layers. Likewise preferred is an arrangement made from a sequence of equal groups, each comprising three superimposed layers, whereby the structure of the groups is symmetrical with respect to the first and second layers. This means that such a group contains, in superimposition, a first, a second, and finally a first layer or a second, a first, and finally a second layer.

According to the invention, the layers are adjacent to one another over substantially the entire extent of their surfaces. It is practical, however, for the first and second layers in the arrangement to be adjacent to one another such that the open ends of the first hollow-fiber membranes extend somewhat beyond the ends of the second hollow-fiber membranes located on this side of the arrangement. The same applies with respect to the open ends of the second hollow-fiber membranes situated on the opposite side of the arrangement. In this manner, the ends of the hollow-fiber membranes at their open end can readily be embedded in the sealing compound.

Embedding can be performed such that in each case only the final open ends, i.e., the ends of the first hollow-fiber membranes facing the distribution space and the ends of the second hollow-fiber membranes facing the collection space, are embedded. In this case, however, it is necessary for the unembedded ends of the first and second hollow-fiber membranes to be closed, which can be accomplished by heat sealing or applying adhesive, for example, or, as previously discussed, by a closed end arch. It is likewise necessary for the closed ends to be shorter than the final open ends of the hollow-fiber membranes in the adjacent layers, i.e., for them to be positioned back from the ends of the latter.

Of course, it is also possible, however, to embed the hollow-fiber membranes at both ends. The final open ends can initially still be open prior to embedding if, as discussed, the first and second layers are somewhat displaced with respect to each other. The closure of the final closed ends of the first and second hollow-fiber membranes required by the invention is then performed by the sealing compound, and the closed end of each hollow-fiber membrane lies within the sealing compound, while the final open end extends through the sealing compound. The latter end is generally initially sealed with a stopper prior to embedding in the sealing compound, to prevent penetration of the sealing compound into the cavity of the respective hollow-fiber membrane. Only after cutting the sealing compound perpendicularly to the hollow-fiber membranes are these ends then open, while the final closed ends remain closed after this cut is made.

It is also possible, in producing the arrangement of first and second hollow-fiber membranes, to embed in the sealing compound individual elements for ventilation of the outer space enclosing the hollow-fiber membranes. These elements can be arranged at individual locations between the first and second layers, for example, whereby the fundamental layer structure of the arrangement should not be impaired significantly. The ventilation elements must be embedded in the sealing compounds such that they extend through them and air can be drawn off from the outer space enclosing the hollow-fiber membranes. In the case of substance-specific treatment of aqueous liquids, for example, these ventilation elements can be hydrophobic hollow-fiber membranes, for example, which are embedded in the sealing compound at both ends. Such designs are described, for example, in EP-A-254 100 or EP-A-138 060.

Hollow-fiber membranes with differing outer contours, i.e., differing outlines when viewed in cross-section, can be used. The hollow-fiber membranes can, for example, have a contour that is essentially round or circular, triangular, rectangular, hexagonal, or octagonal. They can also be oval, elliptical, or with three or four lobes, etc. Contours are preferred with which high filling ratios $\epsilon$ can be realized, such as contours that are approximately triangular, rectangular, square, or hexagonal. The filling ratio in this case refers to the volume of the hollow-fiber membranes that is defined by the outer contour.

High filling ratios $\epsilon$ can also be achieved by a suitable deformation of the hollow-fiber membranes used. For example, hollow-fiber membranes with a round contour can be converted to an approximately rectangular shape, through which high filling ratios can be realized, by calendering a hollow-fiber mat with round hollow-fibers. Another possibility is to subject the hollow fibers to a swelling process. For practical reasons, such a swelling process is performed after the hollow fibers are inserted into the housing of the apparatus according to the invention.

For use in the apparatus according to the invention, hollow-fiber membranes have proven satisfactory that have a wall thickness between 15 $\mu$m and 900 $\mu$m, and hollow-fiber membranes with a wall thickness between 100 $\mu$m and 300 $\mu$m have proven especially satisfactory. Preferably, the hydraulic diameter of the lumen of the hollow-fiber membranes employed is 50 $\mu$m to 900 $\mu$m, and hollow-fiber membranes with a hydraulic diameter of the lumen between 100 $\mu$m and 400 $\mu$m are especially preferred. The hydraulic diameter is defined as 4*A/C, where A is the area of the flow cross-section of the hollow-fiber lumen and C is the circumference of the flow cross-section of the respective hollow-fiber lumen.

Depending on the structure of the arrangement of the first and second hollow-fiber membranes, the geometric structure of the first and second hollow-fiber membranes can be the same or different. It is practical, for example in an arrangement structure comprising an alternating sequence of first and second layers, to design the first and second hollow-fiber membranes identically. On the other hand, for an arrangement structure of groups of three layers each, with each group constructed symmetrically with respect to the first and second layers, it can be advantageous for the hydraulic diameter to be larger for the hollow fiber membranes contained in the type of layer with lower representation.

According to the invention, the thickness of the first and second layers is substantially the same. Substantially the same is understood to mean that the thickness of the first and second layers differs by at most a factor of 1.5. Depending on the application, it can be advisable to use first and second hollow-fiber membranes whose outside diameters differ significantly. However, to adapt, for example, to the pressure drops when the fluid passes through the cavities or lumina of the various hollow-fiber membranes, and to ensure a uniform flow along the hollow-fiber membranes, it can be necessary, for example, to superimpose multiple layers of the hollow-fiber membranes with the smaller diameter and to combine them with a single layer of the hollow-fiber membranes with larger diameter. In such cases, in the context of the present invention, a layer is also understood to be the multilayer structure of the hollow-fiber membranes with smaller diameter, as long as its thickness is substantially the same as that of the single-ply layer of the hollow-fiber membranes of larger diameter.

Hollow-fiber membranes are also understood to be those membrane hollow fibers with more than one continuous cavity extending along the hollow-fiber axis, as described for example in DE-OS 30 22 313, which also can be designed as membrane hollow-fiber chains with a plurality of cavities parallel to each other, as disclosed for example in DE-OS 28 42 835. These can likewise be incorporated into mats which are then stacked to form first and second layers, or, if the membrane hollow fibers have a small dimension perpendicular to the hollow-fiber axis, can also be wound spirally to form bundles of first and second layers. Membrane hollow-fiber chain segments of appropriate length and width can, however, be stacked directly to form first and second layers, whereby the individual chains are closed on one end and the longitudinal axes of the cavities and the chains of the stack are substantially parallel to each other. Particularly if the outer contour of the individual membrane hollow-fiber chains is approximately rectangular, stacks can be realized with very narrow spacing between the layers and thus high filling ratios $\epsilon$.

In a preferred embodiment of the invention, the first and second hollow-fiber membranes are the matrix for the substance-specific groups and the substance-specific groups are immobilized on and/or in the hollow-fiber membranes. Preferably, both the first and second hollow-fiber membranes are the matrix for substance-specific groups. It is also possible, however, for substance-specific groups to be immobilized on and/or in only the first or second hollow-fiber membranes. For the preferred case in which both first and second membranes are the matrix for substance-specific groups, the substance-specific groups in the respective hollow-fiber membranes can be the same or different.

In this embodiment of the apparatus according to the invention, the fluid to be treated flows from the distribution space into the cavities of the first hollow-fiber membranes, open toward the distribution space and closed toward the collection space, passes through the inside of the walls of the first hollow-fiber membranes and through the walls. In this process, the fluid is subjected to a first substance-specific treatment with respect to target substances contained in the fluid. The fluid so treated then flows via the outside of the walls of the first hollow-fiber membranes out of the first hollow-fiber membranes. Subsequently, the fluid so treated flows via the outside of the walls of the adjacent second hollow-fiber membranes into and through the walls of these second hollow-fiber membranes. In this process, an additional substance-specific treatment with respect to target substances contained in the fluid preferably takes place. The fluid stream subjected to this further substance-specific treatment then flows via the inside of the walls of the second hollow-fiber membranes into the cavities of these hollow-fiber membranes, open toward the collection space and closed toward the distribution space, and flows from these cavities into the adjacent collection space.

In the case described here, in which the hollow-fiber membranes are the matrix for the substance-specific groups, the layers preferably are in direct contact with each other in order to maximize the filling ratio $\epsilon$. This minimizes the intermediate or dead space between the hollow-fiber membranes, and the fluid to be treated flows directly from the first hollow-fiber membranes into the second hollow-fiber membranes. In accordance with a preferred embodiment of the invention, the direction of flow of the fluid penetrating the membrane walls is substantially perpendicular to the extent of the hollow-fiber membranes, and the flow component parallel to the hollow-fiber membranes is negligible. This enables a substantially uniform utilization, over the entire length of the hollow-fiber membranes, of the substance-specific groups immobilized on and/or in the hollow-fiber membranes.

In the cases in which the hollow-fiber membranes are the matrix for the substance-specific groups and substance-specific treatments take place in the walls of the hollow-fiber membranes, it is important to dimension the hollow fibers such that the fraction of their volumes consisting of semi-permeable, porous membrane wall, in which the substance-specific treatments can occur, is maximized per hollow-fiber membrane. A preferred ratio $V_w/V_m$ of the volume of the walls of such a hollow-fiber membrane $V_w$ to the hollow-fiber membrane volume $V_m$ comprising the volume of the walls $V_w$ and the volume of the cavity $V_c$ is in the range $0.4<V_w/V_m<0.9$, and an especially preferred ratio is in the range $0.6<V_w/V_m<0.8$.

In a likewise preferred embodiment of the apparatus according to the invention, fluid-permeable, i.e., permeable to the fluid to be treated, carrier materials are positioned between the first and second layers, the materials serving as a matrix for the substance-specific groups. In this case, the hollow-fiber membrane layers located on both sides of the carrier material layer and adjacent to the carrier material are designated as being adjacent to each other. Preferably, the carrier materials are designed such that the spacing between respective adjacent first and second layers within the arrangement, contained in the apparatus according to the invention, of first layers, second layers, and carrier materials is substantially the same.

The carrier materials are advantageously also layered. Experience has shown that the thickness $s_t$ of these carrier material layers should be small compared to the mean length L of the hollow-fiber membranes contained in the apparatus. Good results are obtained if the ratio $s_t/L$ is <0.1. At the same time, it is of advantage in the interest of a uniform flow through the carrier materials for the ratio $s_t/d_a$ of the thickness $s_t$ of the carrier material layer to the outside diameter $d_a$ of the hollow fiber membranes to be between $1<s_t/d_a<500$, preferably $1<s_t/d_a<50$. The outside diameter da of the hollow-fiber membrane is understood to be the outer equivalent diameter $d_a=4*A_a/C_a$, formed by the hollow-fiber membrane cross-sectional area $A_a$ and the outer circumference $C_a$ of the hollow-fiber membrane cross-sectional area $A_a$.

Preferably, the carrier materials are semi-permeable, porous flat membranes, which can have one or more layers, or particles, whereby the particles are incorporated in a fluid-permeable nonwoven, flat membrane, or the like. The carrier materials can also be in the form of textile fabrics or consist of hollow-fiber membrane mats, in which the hollow-fiber membranes, however, are closed at both ends as a result of embedding, for example. Substance-specific groups are immobilized on and/or in these carrier materials, which function as a matrix. In case carrier materials are used, the determination of the carrier material volume when calculating the filling ratio $\epsilon$ is based on the outer contour of the carrier material. The filling ratio $\epsilon$ then, as previously discussed, relates by definition to the total of the volumes of the hollow-fiber membranes of the carrier materials, based on their outer dimensions.

In the preferred case in which only the carrier material is a matrix, the fluid to be treated flows, as in the described case in which the hollow-fiber membranes alone are the matrix for the substance-specific groups, from the distribution space into the cavities of the first hollow-fiber membranes, passes through the inside of the walls of the first hollow-fiber membranes, through the walls, and out of the walls of the first hollow-fiber membranes, whereby it is uniformly distributed over the entire matrix, i.e., the entire carrier material, through which it then flows. Here, the substance-specific treatment of the fluid takes place. Subsequently, the treated fluid flows via the outside of the walls of the adjacent second hollow-fiber membranes into and through the walls of these second hollow-fiber membranes. The fluid stream then flows via the inside of the walls of the second hollow-fiber membranes into the cavities of the second hollow-fiber membranes and from these cavities into the adjacent collection space, and is removed from the housing via the outlet arrangement.

In this case, the function of the first hollow-fiber membranes is merely that of a pure distributor, by which the fluid to be treated is advantageously distributed uniformly over the entire carrier material, and the function of the second hollow-fiber membranes is merely that of a collector, by which the treated fluid is uniformly drawn away from the carrier material. In this manner, uniform utilization of all substance-specific groups immobilized on and/or in the carrier material is achieved.

In another advantageous embodiment of the apparatus according to the invention, the first and second hollow-fiber membranes as well as the carrier materials are the matrix for the substance-specific groups. In this case, the first and second treatment elements have the function of elements that perform a substance-specific treatment in addition to their distribution or collection function. The substance-specific groups immobilized in the hollow-fiber membranes and those immobilized in the carrier material can be the same or different. In an advantageous embodiment of the process according to the invention, the fluid to be treated is successively subjected to at least two different substance-specific treatments in passing through the matrix, i.e., in passing through the first and second hollow-fiber membranes and the carrier material. Of course, it is also possible that, aside from the carrier material, only the first or second hollow-fiber membranes are the matrix for substance-specific groups.

In the described case in which carrier materials are inserted between the first and second layers, it is advantageous for the flow penetrating the matrix to have its main component perpendicular to the first and second layers and the component parallel to the first and second layers to be comparatively negligible. Substantially equal flow rates and thus uniform utilization of the substance-specific groups along the extent of the hollow-fiber membranes and along the extent of the carrier materials are thus attained between the distribution and collection spaces.

In conducting the process according to the invention for substance specific treatment of fluids, the fluid to be treated transports the target substance or substances convectively through the matrix. This requires the semi-permeable, porous-structured membranes used for the first and second hollow-fiber membranes and for the carrier material, if applicable, to have a pore size that permits a convective transport of the fluid to be treated, and containing the target substance or substances, through the membranes. During use, the pore size must also be adjusted to the size of the target substance or substances, which can be in the form of dissolved molecules or macromolecules, or in the form of small particles with a size in the submicrometer range, so that there is no retention of the target substance or substances due to their size.

On the other hand, in the light of the use of the apparatus according to the invention, it is important to use membranes with minimum pore sizes and maximum pore volume or porosity, in order to provide maximum inner surface area of the membranes for the substance-specific treatment. Preferably, the membranes used in accordance with the invention have a mean porosity between 50% and 90% by volume. The mean porosity is understood to be the ratio of the pore volume of the membrane to the membrane wall volume, where the membrane wall volume is the sum of the pore volume and the volume of the material constituting the membrane structure. Finally, in embodiments of the apparatus according to the invention that include carrier materials in the form of particles, the pore size of the hollow-fiber membranes must be adapted to the size of the particles, such that the particles are retained by the membranes. In these cases, the membranes are thus advantageously substantially permeable for the target substance or substances and substantially impermeable for the particles of the carrier material. The first and second hollow-fiber membranes in this case can have different pore sizes, in particular when the apparatus according to the invention is always subjected to flow in the same direction.

The requirements placed on the construction of the membrane, i.e., on its structure and pore size distribution across the membrane thickness, are given by the respective application for the substance-specific treatment. The membrane structure can be isotropic across the thickness, i.e., the pore diameters are essentially constant within the membrane structure, or it can be anisotropic, symmetrical, or asymmetrical. Membranes are preferred, however, with substantially isotropic pore structures in all spatial directions. Substantially isotropic pore structures are understood to be those structures in which the pore size changes by at most a factor of 10 in the directions of the membrane extent. Such substantially isotropic structures are distinguished by a large inner surface area, on which a large number of substance-specific groups can be immobilized. Furthermore, such a structure leads to a uniform utilization of these groups during use.

Membranes are preferred with a mean pore diameter between 0.01 and 10 $\mu$m, and those with a mean pore diameter between 0.1 and 3 $\mu$m are especially preferred.

To determine the mean pore diameter, different methods are used depending on the pore diameter and membrane structure. For pore structures that are essentially isotropic, pore diameters are determined indirectly by a filtration experiment in which an aqueous dextran solution with a prescribed size distribution of dextran molecules is filtered through the membrane. From the measured relative retention as a function of the nominal molecule diameter, the pore diameter distribution is calculated and from it the mean pore diameter. This method is described, for example, by K. Sakai, J. Membrane Science 96 (1994), pp. 91–130, and by Shin-ichi Nakao, J. Membrane Science 96 (1994), pp. 131–165, for dialysis and filtration membranes, respectively.

For anisotropic membranes, which have a layer with denser pore structure, for example, the cited determination methods based on filtration experiments are also used to determine the mean pore diameter within the denser layer. To determine the mean pore diameters of the coarser pore areas of the anisotropic membranes, an image-analysis method according to L. Zeman et al., J. Membrane Science 71 (1992), pp. 221–231, is employed. This method is suitable for pore sizes between 0.1 $\mu$m and 10 $\mu$m, by its nature for both isotropic and anisotropic pore structures.

In the apparatus according to the invention, or to conduct the process according to the invention, preferably porous membranes with a large inner surface area are used. Porous membranes have proven satisfactory that have a BET surface area between 2 and 300 m$^2$ per cm$^3$ of membrane volume, and those membranes with a BET surface area between 4 and 30 m$^2$ per cm$^3$ of membrane volume have proven especially satisfactory. The BET method for determining the surface area of porous membrane structures, which is based on the measurement of nitrogen adsorption, is described by K. Kaneko, J. Membrane Science 96 (1994), pp. 59–89.

Depending on the desired application of the apparatus or process according to the invention, the first and second hollow-fiber membranes and the possibly used flat membranes can be the same or different. Differences can be with respect to their pore structure or pore diameter, for example, but also with respect to the membrane-contained groups that are intended for interaction with the target substances in the fluid to be treated.

For the case that particles are used as a carrier material, the particles are for practical reasons incorporated in a fluid-permeable nonwoven, flat membrane, or the like, to stabilize, for example, the position of the particles between the first and second layers and to achieve a uniform distribution of the particles between the layers or also a uniform spacing between the layers. The fluid-permeable nonwoven or, for example, the flat membrane can have a relatively coarse structure; the only essential point is that the particles can readily be incorporated into the nonwoven or the flat membrane and are positioned in a stable manner during subsequent use.

Such particles can be those, for example, that are used in the prior art in columns for affinity chromatography. In this case, the structure of the particles can be dense, so that target substances contained in the fluid to be treated can penetrate to substance-specific groups immobilized inside the particles, for example only by solvent action or by diffusion. Preferably, however, the particles have a porous structure, and a convective transport of the target substances to the immobilized substance-specific groups is also possible on the inner surface defined by the pores. The pore diameter of these particles preferably lies between 0.01 and 10 $\mu$m, and an especially preferred range is 0.1 to 3 $\mu$m.

Particles, however, are also understood to be macromolecules such as proteins (e.g., albumin), to which smaller molecules (e.g., bilirubin) can be bound.

Their form can be spherical or any other form such as ellipsoidal or rod-shaped. The particles should be small compared to the outside diameter of the hollow fiber membranes. Preferably, the ratio $d_p/d_a$ of the mean particle diameter $d_p$ to the outside diameter $d_a$ of the hollow-fiber membranes is less than 0.2. The mean particle diameter is defined as the arithmetic mean of the diameters of the particles contained in the housing, whereby for non-spherical particles the equivalent diameter of a sphere of the same volume is used as the particle diameter. The outside diameter $d_a$ of the hollow-fiber membranes is equal to the outer equivalent diameter $d_a = 4A_a/C_a$. with respect to the circumference $C_a$ of the hollow-fiber membrane cross-sectional area $A_a$.

As previously discussed, it is advantageous if the flow penetrating the hollow-fiber membranes and any carrier materials used has its main component perpendicular to the first and second layers and the component parallel to the first and second layers is negligible in comparison. For this reason, the first and second hollow-fiber membranes or the inserted carrier material layers have, perpendicular to their longitudinal axes or to their flat extent, a permeability preferably greater by at least a factor of 2, with a factor of 5 to 50 being especially preferred, than in the longitudinal direction of the hollow-fiber membranes or parallel to the flat extent of the carrier material.

Another advantage of the apparatus according to the invention is that the "column height", i.e. the path the fluid stream to be treated in the matrix containing substance-specific groups must travel, is comparatively short compared to particle-filled chromatographic columns, for example, also resulting in a reduction of the attendant pressure drops. For example, these paths can represent only the respective walls of the hollow-fiber membranes and the thickness of the carrier material layer, which, as discussed, is itself kept thin compared to the length of the hollow-fiber membranes and thus to the cross-sectional dimension of the housing in the longitudinal extent of the hollow-fiber membranes. Due to the required high filling ratios, there is at the same time a high volume density of substance-specific groups in the housing of the apparatus according to the invention, and, due to the layered arrangement of the hollow-fiber membranes, there is uniform utilization of these groups despite the high volume density.

The shape of the inner cross-section of the housing, in which the layers of first and second hollow-fiber membranes, together with any carrier material present, are arranged, can be freely selected. Preferably, however, housings with square, rectangular, or round inner cross-section are employed, where the inner cross-section is understood to be the cross-section of the housing perpendicular to the extent of the hollow-fiber membranes located therein. With a structure of the arrangement of first and second hollow-fiber membranes of flat first and second layers stacked on one another or folded in a zigzag shape, it is practical to use housings with a rectangular or square cross-section. For first and second layers wound spirally around a winding axis, on the other hand, it is practical to use a housing with a round cross-section.

It is also possible for a housing to contain a plurality of modules. Modules are understood to be segments with a plurality of first and second layers, possibly with intermediate carrier material. Such segments, for example, have a contour of a right parallelepiped and a structure such that the ends of the first and second hollow-fiber membranes constituting the layers are embedded in sealing compounds in such a way that the open ends of the first hollow-fiber membranes extend through the first sealing compound and their closed ends are embedded in the oppositely located second sealing compound, and that the open ends of the second hollow-fiber membranes extend through the second sealing compound and their closed ends are embedded in the first sealing compound. The sealing compounds can be spaced from each other by a rectangular frame, for example, resulting at the same time in a limitation and sealing of the module on the sides. The top and bottom sides of the module can be open or closed.

These modules can be superimposed in housings of the apparatus according to the invention and connected in parallel, so that partial streams of the fluid to be treated pass through the individual modules at the same time. They can also be superimposed but connected in series, so that the fluid to be treated flows successively through the individual modules in cascade fashion. Of course, they can also be arranged successively in a housing of appropriate length, such as a tube, and the tube can in turn be wound up spirally.

The apparatus or process according to the invention can be used successfully for a wide variety of substance-specific fluid treatments. Considering the respective treatment process, multiple different substance-specific groups can be immobilized on and/or in the matrix and interact specifically with various target substances. Different membranes with different substance-specific groups can also be used together for the first and second hollow-fiber membranes and the flat membrane possibly used as a carrier material, if the application so requires. In this manner, different substance-specific treatments can take place in the matrix.

In this context, there are applications in which one group of target substances to be removed are in part positively and in part negatively charged, for example. Such groups of target substances can be removed from the fluid to be treated by employing, when conducting the inventive process, membranes with substance-specific groups having different charges, for example. An example is the removal of cytokine-inducing substances from infusion solutions or dialysate. It is well known that these cytokine-inducing substances are charged positively as well as negatively. The contact of these substances with white blood cells stimulates them to produce cytokines, with adverse side effects for the patient. By use of first hollow-fiber membranes with anionic and second hollow-fiber membranes with cationic properties, for example, in an appropriate apparatus according to the invention, the entire target group can be removed by adsorption.

Of course, additional combinations of different substance-specific treatments are possible using the apparatus or process according to the invention, for example reverse phase chromatography, adsorption to hydrophobic surfaces, or affinity chromatography. In individual cases, such a treatment of the fluid by interaction with the substance-specific groups can be combined with a prefiltration of the fluid, which then takes place in the first hollow-fiber membranes, in order, for example, to retain certain components in the fluid to be treated that are not to come into contact with the substance-specific groups.

In a preferred embodiment of the process according to the invention, the fluid to be treated is recirculated and passes through the treatment process multiple times until the desired treatment level has been attained.

In accordance with an especially preferred embodiment of the invention, the substance-specific groups are ligands for affinity separation of ligates from liquids to be treated, or catalysts, where catalysts are understood to include biocatalysts such as enzymes. Preferred processes according to the invention are those for cleaning/separation of ligates from a ligate-containing liquid, where a matrix is selected on and/or in which ligands for these ligates are immobilized, and processes for catalytic treatment of liquids, where a matrix is selected on and/or in which catalysts are immobilized. Furthermore, preferred processes are those for catalytic treatment of liquids, whereby a matrix is selected on and/or in which catalysts are immobilized. The catalytic processes also include biocatalytic processes such as enzyme processes.

For immobilization of substance-specific groups on and/or in the matrix, the processes described in the literature can be employed. The literature can also be used with respect to the substance-specific groups applying to the respective substance-specific treatment. Various possibilities for immobilization of substance-specific groups can be considered, with respect to both the location and manner in which they are immobilized.

These substance-specific groups can be coupled to the matrix by adsorption or via covalent bonds. This coupling to the matrix can take place prior to insertion into the housing or after inserting the matrix into the housing of the apparatus according to the invention. Depending on the individual application, the substance-specific groups can, for example, be coupled essentially homogeneously to the entire surface of the matrix, i.e., both to the outer surfaces and to the inner surfaces, formed by the pores for example, i.e. immobilized on and in the matrix. It can be necessary, however, for the substance-specific groups to be immobilized only on a portion of these surfaces.

There can also be a direct inclusion of substance-specific groups in the matrix material, in the case of matrices made from polymeric materials, by modification of the polymeric material with ionic, hydrophilic, or hydrophobic groups, for example, or by using polymer blends in which at least one polymer component has substance-specific groups.

Another possibility, for example in the case of membrane-like matrices, is to incorporate substance-specific groups or carrier substances or particles having such groups into the pore system of a membrane during its manufacture, or subsequently in the finished membrane, such as by flooding-in. In the latter case, it is practical for the membrane to have an asymmetrical structure and possibly a skin, whereby the openings of the skin or the pores of the fine-pored side of the membrane are dimensioned such that the substance-specific groups or the cited carrier substances or particles cannot penetrate. The flooding-in and subsequent substance-specific fluid treatment are conducted such that the material streams enter the membrane from the open-pored side and the substances or particles carrying the substance-specific groups are retained by the side in which the pores are less open.

In the cases in which substance-specific groups are immobilized in membranes, the pore size of the membrane used should be selected such that the target substances can be transported convectively through the membrane by the fluid to be treated despite the substance-specific groups immobilized in the pores.

There are no restrictions whatsoever with respect to the material from which the first and second hollow-fiber membranes and any carrier material are made. Membranes and carrier materials can be used that are made from inorganic materials such as glass, ceramics, $SiO_2$, carbon, or metal, or from organic polymers or blends thereof. The polymers can be hydrophilic and/or hydrophobic in nature. They can be selected from the group of cellulosic polymers such as cellulose or regenerated cellulose, modified cellulose such as cellulose esters, cellulose ethers, amine-modified celluloses, or blends of cellulosic polymers, from the group of synthetic polymers such as polyacrylonitrile and corresponding copolymers, polymers containing polyurethane, polyarylsulfones and polyarylethersulfones such as polysulfone or polyethersulfone, polyvinylidene fluoride, polytetrafluoroethylene, water-insoluble polyvinyl alcohols, aliphatic and aromatic polyamides, polyimides, polyetherimides, polyesters, polycarbonates, polyolefins such as polyethylene, polypropylene, polyvinyl chloride, polyphenylene oxide, polybenzimidazoles and polybenzimidazolones, as well as from modifications, blends, mixtures, or copolymers derived from these polymers. Other polymers can be mixed as additives with these polymers or polymer blends, for example polyethylene oxide, polyhydroxyether, polyethylene glycol, polyvinylpyrrolidone, polyvinyl alcohol, or polycaprolactone, or inorganic substances such as $SiO_2$. In individual cases, the membrane can also have been subjected to a surface modification, for example, in order to establish certain properties of the membrane surface, such as in the form of certain functional groups.

There has been particularly good experience with membranes made from solvent-stable and pH-stable polymers, in particular with membranes made from polytetrafluoroethylene or polyvinylidene fluoride, and from modifications, blends, mixtures, or copolymers derived therefrom. Such membranes are described in DE-A-39 23 128, for example. Celluloses and polyamides, and modifications, blends, mixtures, or copolymers obtained therefrom, have proven especially satisfactory, since they have adequate stability toward alkalis, and ligands can be covalently bound to them in a simple manner.

The materials the first and second hollow-fiber membranes and possibly the carrier materials are made from can be the same or different. It is preferred to use the same material for the membranes and any carrier material. In individual cases, the first and second hollow-fiber membranes can also consist of different materials.

Numerous applications are known for cleaning/separation of ligates from a ligate-containing liquid using affinity separation or affinity chromatography, Affinity chromatography in this case is understood to be biospecific adsorptions and also separation processes such as ion-exchanger chromatography, metal chelate chromatography, hydrophobic chromatography, covalent chromatography, or direct sorption of molecules onto a specific adsorber material.

Applications of interest relate to cleaning of monoclonal or polyclonal antibodies, removal of proteases for stabilizing biological fluids, recovering or therapeutically removing components from blood plasma, removing pyrogens from biological or pharmaceutical liquids, separating enantiomers, and isolating enzymes, just to mention a few examples.

As used herein, ligands can act non-specifically, group-specifically, or specifically, depending on the application (see E. Klein, "Affinity Membranes", John Wiley & Sons, Inc., 1991). Such ligands are, for example, lipoproteins—such as HDLs—lysoyzme, monoclonal antibodies, polyclonal antibodies, peptides, antigenic substances, glycoproteins, protein A, protein G, enzymes, receptor proteins, growth factors for cells, hormones, regulation proteins, inhibitors, cofactors, heparin, protamine, poly-L-lysines, biotin, avitin, amino acids such as tryptophan, L-histidines, or antibiotics. Furthermore, the ligands can also be salts such as $Fe_4[Fe(CN)_6]_3$ or colorants. However, they can also be hydrophilic groups or ionic groups in the surface of the membrane material itself or polymers bound to the surface. Examples, not to be considered restrictive, are also cited in WO 90/04609, WO 90/05018, EP-A-0 565 978, and in E. Klein, "Affinity Membranes", John Wiley & Sons, Inc., 1991.

Without providing an exhaustive list of possibilities at this point, the ligands can be generated, for example, by surface modification of the matrix, they can be bound to the surface directly or via spacer molecules, or bound to the surface via tentacle systems or chains, whereby a plurality of ligands can be bound to each chain or each tentacle system.

To increase the capacity of ion exchanger matrices in particular, there are various methods known per se that can be used to increase the number of substance-specific groups, i.e., of ligands on the surface of the matrices. Preferably, the ligands are coupled to the membrane via molecules of long-chain linear polymers, whereby the molecules of the long-chain linear polymers carry a plurality of ligands. The use of long-chain linear polymers with side arms, so-called tentacles, where the ligands are present on the tentacles, is described, for example, by W. Muller, J. Chromatogr., Vol. 510 (1990), p. 133. The production of such tentacles is described, for example, in Tsuneda et al. (Biotechnol. Prog., Vol. 10 (1994), pp. 76–81, and J. Chromatogr., Vol. A 689 (1995), pp. 211–218), and can take place via radiation-induced graft polymerization of a monomer containing an epoxy group, such as glycidyl methacrylate, with subsequent chemical conversion into $SO_3H$ groups or diethylamino groups. Another method for grafting of nitrogenous polymeric flat membranes that can be used to increase the ion exchanger capacity of the membrane treatment elements according to the invention is described in EP-A-0 490 940.

Membranes containing polyamides derivatized with polymerizable double bonds, in accordance with DE-OS-195 01 726, are well suited for the apparatus according to the invention or for conducting the process according to the invention. These derivatized polyamides can be obtained by converting the polyamide in an aqueous solution with a compound containing both a polymerizable double bond and an oxirane ring, and they can be converted to block polymers with improved properties.

For applications in the field of enzymatic or general catalytic treatment of liquids, matrices can be selected on and/or in which enzymes or catalysts have been immobilized using methods known per se.

Applications in the field of enzymatic fluid treatment are, for example, enzymatic esterification of ethylene glycoside, enzymatic hydrolysis of starch via amyloglucosidase, enzymatic hydrolysis of enantiomers, plant oils, animal oils such as fish oil, or triglycerides via lipases, enzymatic decomposition of proteins via proteinases, lactose decomposition in milk via lactase, and decomposition of blood components via corresponding enzymes, such as urea via urease. Applications cited in U.S. Pat. No. 4,061,141 are also included herein. Other enzymes and their use and immobilization possibilities are described in Ullmann's Enzyklopadie der technischen Chemie (Encyclopedia of Industrial Chemistry), 4th Ed., Vol. 10, pp. 475–561, Verlag Chemie, Weinheim 1975. Data concerning catalysts and their immobilization in membrane structures, and their use in the framework of the present invention, can be found in U.S. Pat. No. 4,266,026, for example.

BRIEF DESCRIPTION OF THE DRAWINGS

In the following, the invention will be explained in more detail on the basis of the drawings, in simplified schematic representation.

DETAILED DESCRIPTION OF THE PREFERRED EMBODIMENTS

Figure 1:
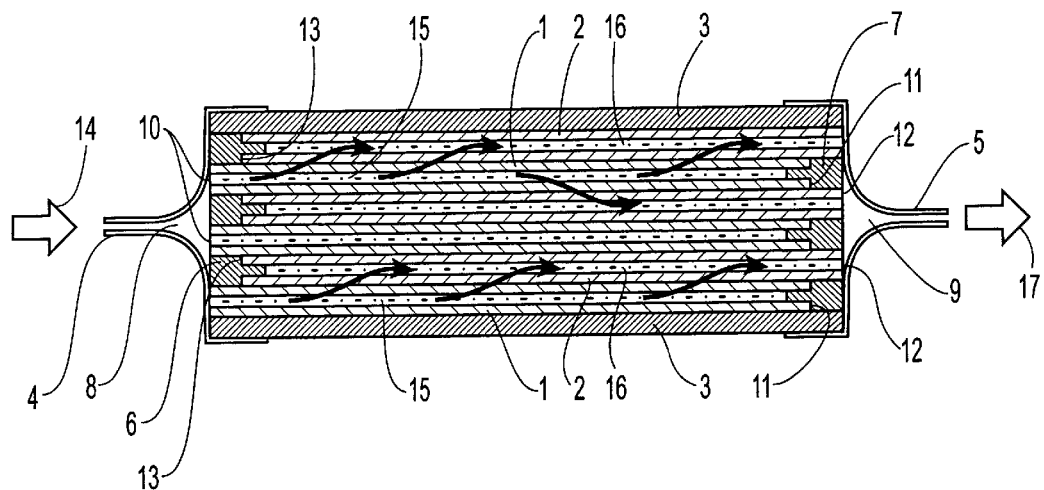
FIG. 1 shows a longitudinal section through an apparatus according to the invention with first and second hollow-fiber membranes that at the same time serve as a matrix.

FIG. 1 shows a longitudinal section through an apparatus according to the invention with first hollow-fiber membranes 1 and second hollow-fiber membranes 2, which in this case serve as a matrix for the immobilized substance-specific groups. The first and second hollow-fiber membranes are situated in a housing 3 with an inlet arrangement 4 for the fluid to be treated and an outlet arrangement 5 for the treated fluid. The hollow-fiber membranes are arranged in first and second layers that in this illustration run longitudinally to the hollow-fiber membranes and perpendicularly to the drawing plane. The ends of the first and second hollow-fiber membranes 1,2 are embedded in sealing compounds 6,7, which together with the inlet arrangement 4 delimit a distribution space 8 and together with the outlet arrangement 5 a collection space 9.

The ends 10, facing the distribution space 8, of the first hollow-fiber membranes 1 are embedded in the sealing compound 6 facing the distribution space 8 in such a way that they extend through the sealing compound 6 and are open toward the distribution space 8. The other ends 11 of the first hollow-fiber membranes are embedded in the sealing compound 7 in such a way that these ends 11 are closed by the sealing compound 7 with respect to the collection space 9. Likewise, the ends 12, facing the collection space 9, of the second hollow-fiber membranes 2 are embedded in the sealing compound 7 facing the collection space 9 in such a way that they extend through the sealing compound 7 and are open toward the collection space 9. The other ends 13 of the second hollow-fiber membranes 2 are embedded in the sealing compound 6 in such a way that these ends 13 are closed by the sealing compound 6 with respect to the distribution space 8. The first hollow-fiber membranes 1 and second hollow-fiber membranes 2 are thus designed as deadend membrane elements, whose open ends are opposite each other.

The first and second layers are arranged in an alternating sequence with respect to each other and lie adjacently and in superimposed contact with one another, so that a high filling ratio $\epsilon$ is attained, which in this case is calculated as the ratio of the volume of the hollow-fiber membranes, with respect to their outside diameter, to the volume of the housing.

In an embodiment of the process according to the invention, the fluid to be treated, represented by arrow 14, flows through the inlet arrangement 4 of the apparatus shown in FIG. 1 into the distribution space 8 and from it into the cavities 15 of the first hollow-fiber membranes 1, and passes into and through their walls. In this process, the fluid is subjected to a substance-specific treatment. The fluid so treated leaves the walls of the first hollow-fiber membranes 1, then flows via the outside of the walls of the adjacent second hollow-fiber membranes 2 into and through the walls of these second hollow-fiber membranes. In this process, a second substance-specific treatment takes place with respect to target substances contained in the fluid. The fluid stream subjected to this further substance-specific treatment then flows via the inside of the walls of the second hollow-fiber membranes 2 into their cavities 16 and from these cavities 16 into the adjacent collection space 9, and leaves the apparatus as a treated fluid, as indicated by arrow 17, via the outlet arrangement 5.

Figure 2:
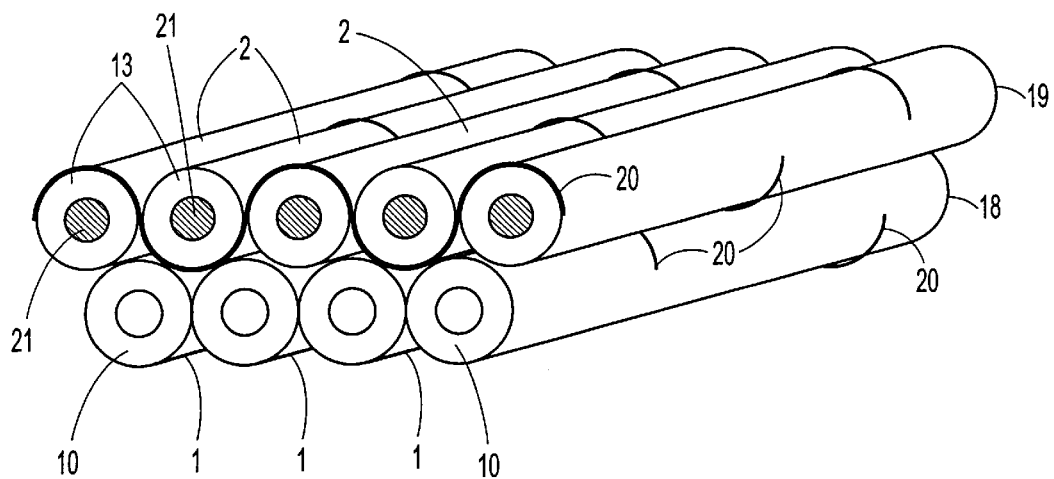
FIG. 2 shows a segment formed by two superimposed hollow-fiber mats.

In FIG. 2, a segment of a first layer 18 and a second layer 19 is illustrated schematically, the layers made from mats of first and second hollow-fiber membranes 1,2, each joined to each other via transverse threads 20. The ends 10 of the first hollow-fiber membranes are open at the end facing the viewer; if the layers were used in an apparatus according to the invention, the fluid to be treated would flow via these ends into the cavities of the first hollow-fiber membranes 1. The ends 13 of the second hollow-fiber membranes 2, on the other hand, are closed on this end with a stopper 21, for example. The sealing compound enclosing the hollow-fiber ends is not represented in this figure.

Figure 3:
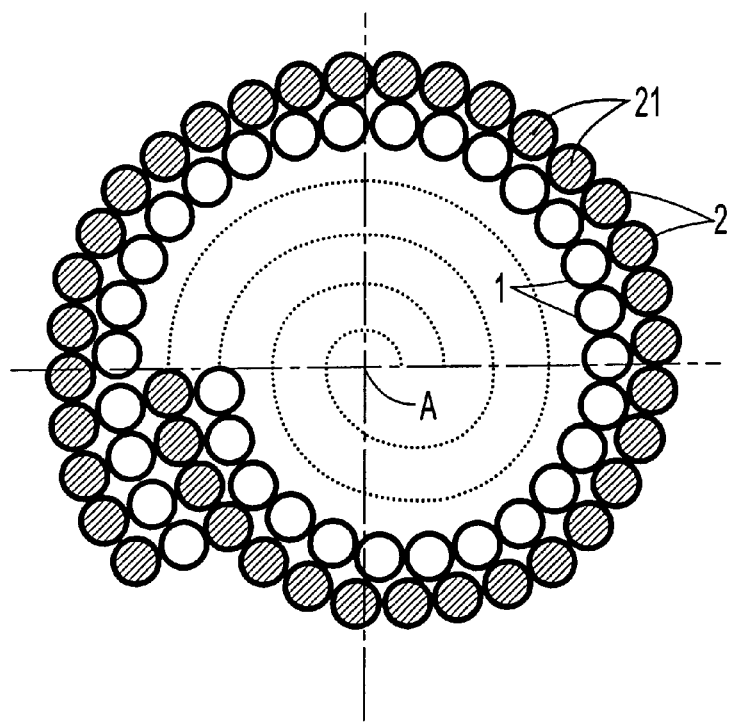
FIG. 3 shows a cross-section of a pair of first and second hollow-fiber layers wound spirally around a winding axis.

Such an arrangement of a first layer of first hollow-fiber membranes 1 and a second layer of hollow-fiber membranes 2 can, as illustrated schematically in FIG. 3, be wound spirally around a winding axis A parallel to the hollow-fiber membranes and in this illustration perpendicular to the drawing plane, so that a bundle with a spirally-shaped layer structure is formed. In FIG. 3, only one winding layer is shown. The continuation for the additional winding layers toward the inside, for example, is represented by spiral dashed lines extending through the axes of the hollow-fiber membranes arranged in the interior of the spirally shaped bundle. In this figure as well, the ends of the first hollow-fiber membranes facing the viewer are open, and those of the second hollow-fiber membranes are illustrated as being closed by a stopper 21.

Figure 4:
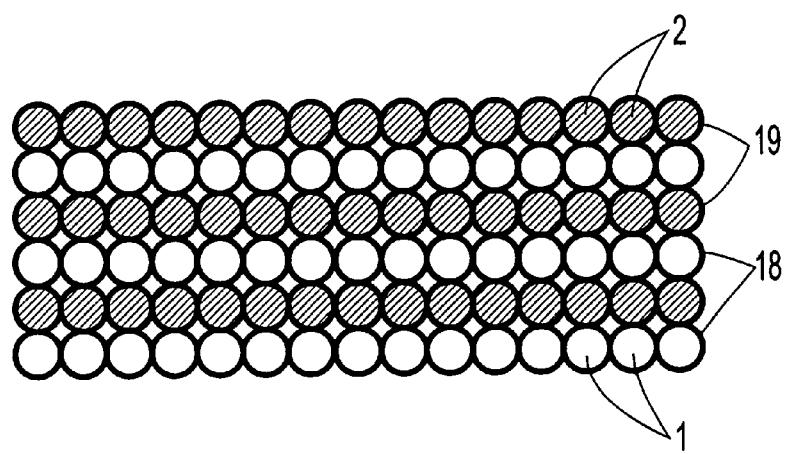
FIG. 4 shows a cross-section through an arrangement of first and second hollow-fiber membranes with an alternating sequence of first and second layers.

In FIG. 4, a stacked structure with an alternating sequence of superimposed first layers 18 and second layers 19 is illustrated. The axes of the first and second hollow-fiber membranes 1,2 extend perpendicularly to the drawing plane.

Figure 5:
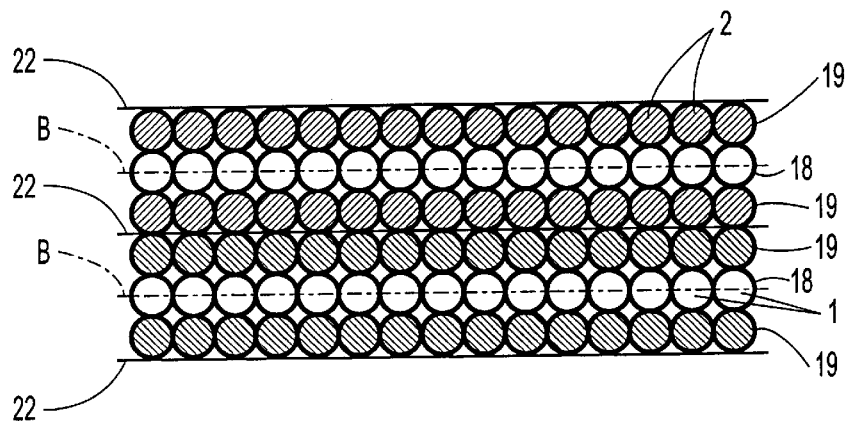
FIG. 5 shows a cross-section through an arrangement of first and second layers with symmetrical groups of three superimposed layers each.

FIG. 5 shows a stacked arrangement of first and second layers 18,19 formed from a sequence of groups, each of which contains three superimposed layers. These groups, which in FIG. 5 consist in each case of a second layer 19, a first layer 18 on top of it, and another second layer 19, are symmetrical in each case with respect to a plane B. In such an arrangement, the fluid to be treated flows into the hollow-fiber membranes of the respective middle first layer 18 and from it symmetrically into the hollow-fiber membranes of the second layers 19 above and below it. With the identical design of the individual groups, there is ideally no fluid flow between the groups. A film 22 can also be inserted between the layers of adjacent groups, as shown in FIG. 5, if this is deemed practical for controlling the flow or for simplifying manufacture.

Figure 6:
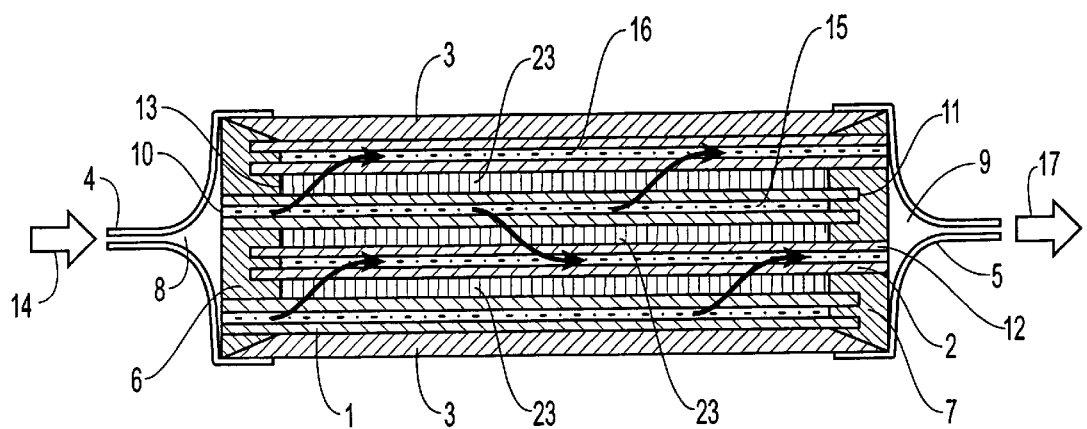
FIG. 6 shows a longitudinal section through an apparatus according to the invention with flat membranes inserted as a carrier material between the first and second layers.

FIG. 6 shows a longitudinal section through an apparatus according to the invention, which is substantially the same as that shown in FIG. 1, except that carrier materials in the form of single-or multi-layer flat membranes 23 are inserted between the layers of the first hollow-fiber membranes 1 and second hollow-fiber membranes 2. The flat membranes 23 in this case can, by themselves or in combination with the first and second hollow-fiber membranes 1,2, be a matrix for the substance-specific groups.

In the latter case, in conducting the process according to the invention, the fluid to be treated, again represented by arrow 14, flows through the inlet arrangement 4 of the apparatus shown in FIG. 6 into the distribution space 8 and from it into the cavities 15 of the first hollow-fiber membranes 1, and passes into and through their walls. In this process, the fluid is subjected to a first substance-specific treatment, for example. Then, the fluid so treated leaves the walls of the first hollow-fiber membranes 1 and flows uniformly through the adjacent flat membranes 23, whereby the fluid is subjected to an additional substance-specific treatment. The fluid then flows via the outside of the walls of the adjacent second hollow-fiber membranes 2 into and through their walls, whereby a third substance-specific treatment takes place with respect to target substances contained in the fluid. Subsequently, the fluid stream, now having undergone three substance-specific treatments, flows via the inside of the walls of the second hollow-fiber membranes 2 into their cavities 16, and from these cavities 16 into the adjacent collection space 9, and leaves the apparatus as a treated fluid, as indicated by arrow 17, via the outlet arrangement 5. In the threefold substance-specific treatment, the treatments can, as previously described, be identical or different, for example treatments concentrating on different target substances.

Figure 7:
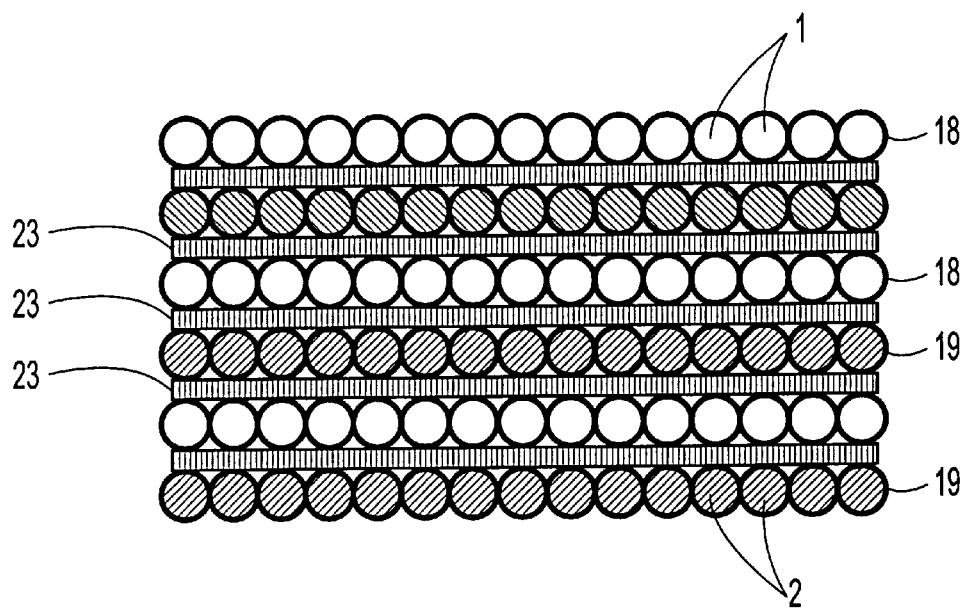
FIG. 7 shows a cross-section through an arrangement of alternating first and second layers perpendicular to the extent of the hollow-fiber membranes, with flat membranes inserted as a carrier material between the first and second layers.

FIG. 7 shows a stacked structure of hollow-fiber membranes with an alternating sequence of first layers 18 and second layers 19, in which flat membranes or flat-membrane stacks 23 are inserted as a carrier material between the first layers 18 and second layers 19 in each case. The axes of the first and second hollow-fiber membranes 1,2 again extend perpendicularly to the drawing plane.

Figure 8:
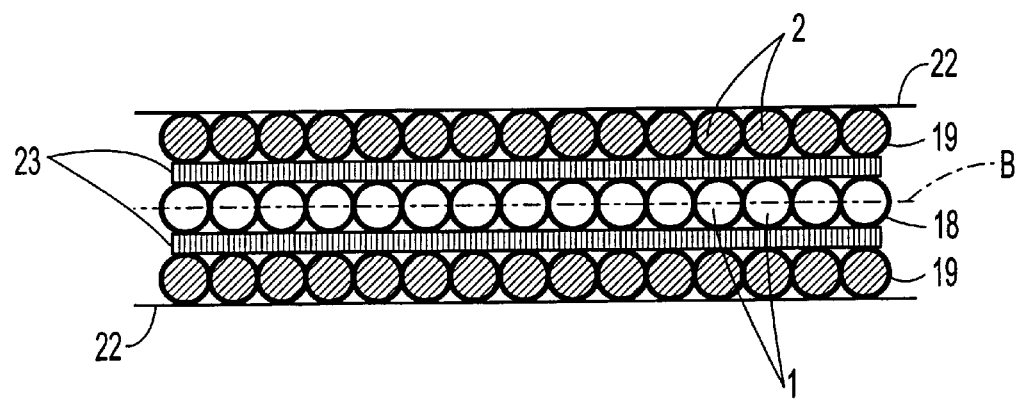
FIG. 8 shows a cross-section through an arrangement of first and second layers with symmetrical groups of three superimposed layers each, each group having flat membranes inserted as a carrier material between the first and second layers.

FIG. 8 shows a segment of a stacked arrangement of first and second layers 18,19 in cross-section, whereby the arrangement, similar to FIG. 5, consists of a group of three superimposed layers. This group of a second layer 19, a first layer 18 on top of it, and again a second layer 19 is symmetrical with respect to a plane B. In contrast to the group illustrated in FIG. 5, FIG. 8 shows a flat membrane 23 inserted as a carrier material between the layers 18,19 of first and second hollow-fiber membranes 1,2. Analogously to the arrangement shown in FIG. 5, the fluid in the arrangement of FIG. 8 flows into the first hollow-fiber membranes 1 of the middle first layer 18 and from it symmetrically into the second hollow-fiber membranes 2 of the second layers 19 situated above and below it. Additional identical groups can be adjacently arranged above and below the group shown in FIG. 8, the groups if desired being separated from one another by a film 22.

Figure 9:
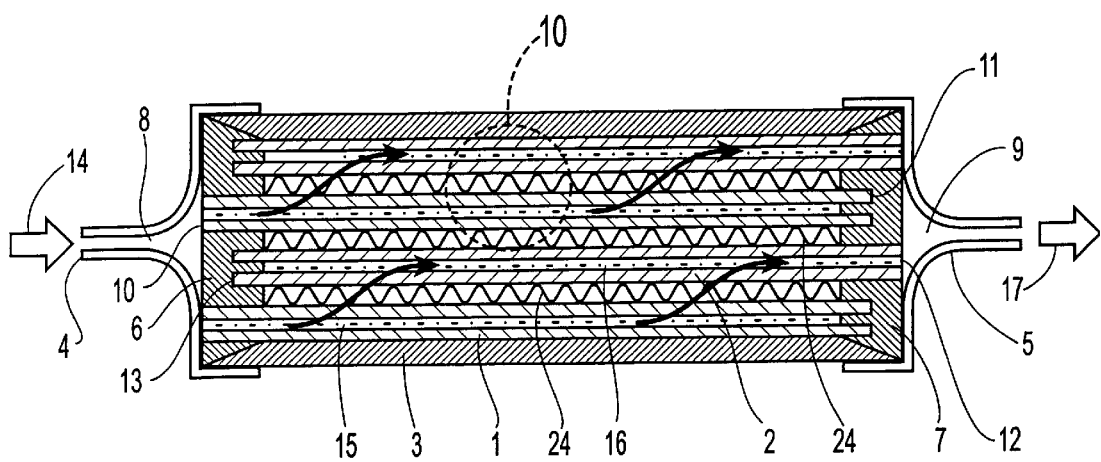
FIG. 9 shows a longitudinal section through an apparatus according to the invention in which particles incorporated in a nonwoven are inserted as a carrier material between the first and second layers.

In FIG. 9, a further embodiment of an apparatus according to the invention is shown in which layers of particles 24 incorporated into fluid-permeable nonwovens are inserted as a carrier material between the first and second hollow-fiber membranes 1,2. Otherwise, the embodiment of the apparatus according to the invention in FIG. 9 corresponds to that of FIG. 6, and the process enabled by the invention for substance-specific fluid treatment is the same. Such an apparatus can also have openings, not illustrated in this figure, joined to the outside space enclosing the hollow-fiber membranes. These openings can serve, for example, as filler openings if the particles are inserted, by flooding-in, for example, after manufacturing the apparatus according to the invention, into the cavities formed for example by nonwovens between the first and second layers. An Apparatus not containing particle-shaped carrier material can also have such openings, such as for ventilation of the outside space enclosing the hollow-fiber membranes.

Figure 10:
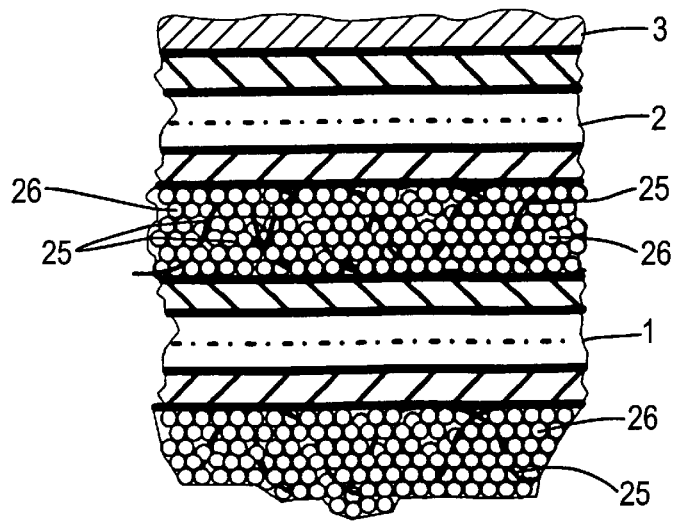
FIG. 10 shows a detailed view of a longitudinal section through an apparatus according to the invention with particles incorporated in a nonwoven as a carrier material.

Detail C indicated in FIG. 9 is shown magnified in FIG. 10. Between the layer of first hollow-fiber membranes 1 and the layer of second hollow-fiber membranes 2 in detail C, there is a nonwoven 25 in which particles 26 are incorporated such that a uniform and stable distribution of the particles between the first and second layers is attained.

Figure 11:
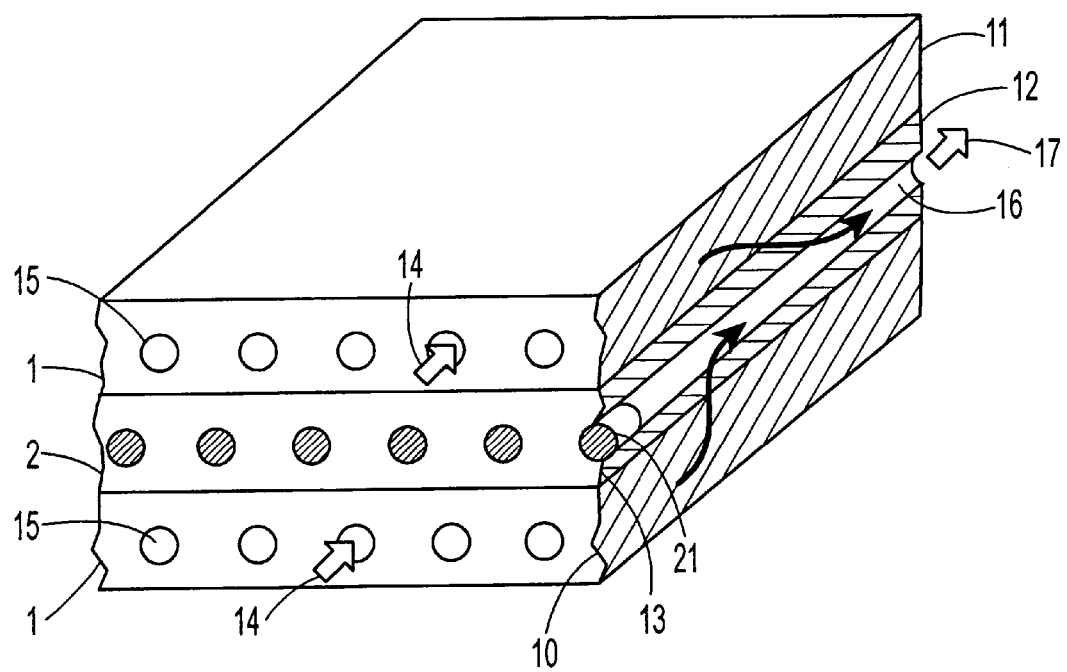
FIG. 11 shows a segment of a stacked arrangement of membrane hollow-fiber chains.
Figure 12:
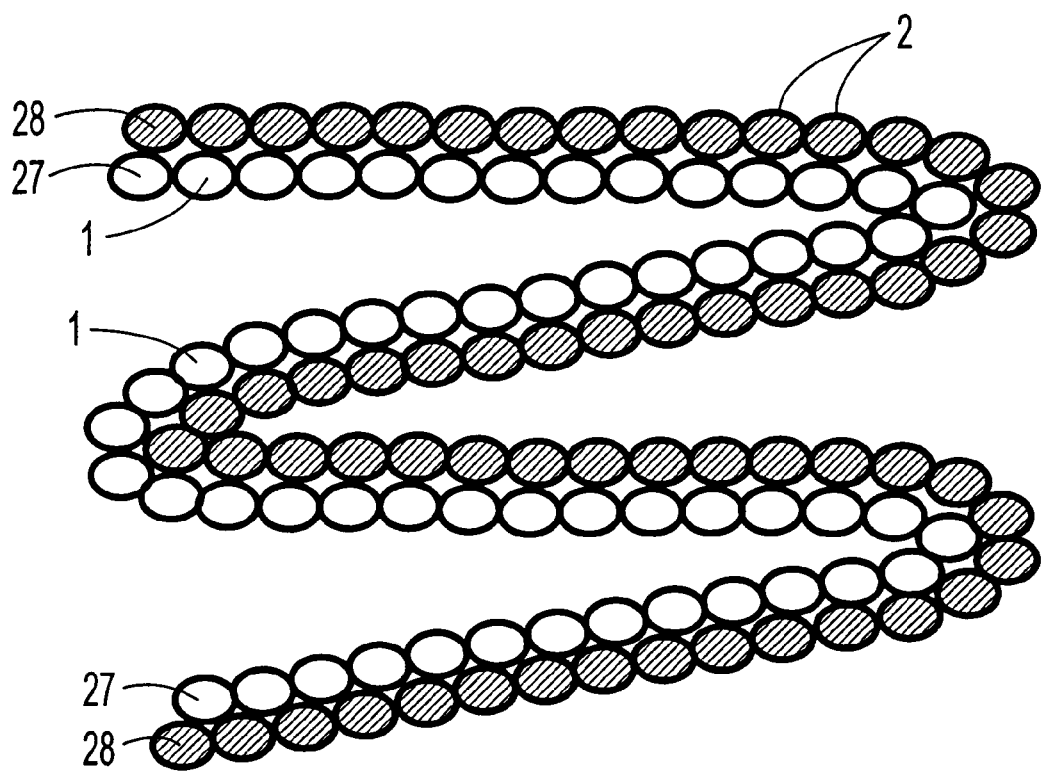
FIG. 12 shows a segment of an arrangement of a superimposed first hollow fiber mat containing first hollow fiber membranes, and a second hollow fiber mat containing second hollow fiber membranes, wherein the first and second hollow fiber mats are jointly folded in a zigzag manner to form a stack.

FIG. 11 shows a segment of a stacked arrangement of membrane hollow-fiber chains, each with a plurality of cavities parallel to each other. Here, segments of two membrane hollow-fiber chains 1 functioning as first hollow-fiber membranes are illustrated, between which is a membrane hollow-fiber chain 2 functioning as a second hollow-fiber membrane. The membrane hollow-fiber chains have a rectangular cross-section, enabling filling ratios $\epsilon$ of almost 100% in a stacked structure such as that of FIG. 11. The fluid 14 to be treated flows in this embodiment from a distribution space, not illustrated, at the open ends 10 into the parallel cavities 15 of the first membrane hollow-fiber chains 1, through the membrane walls of the first membrane hollow-fiber chains 1, those of the second membrane hollow-fiber chain 2, and then into the parallel cavities 16 of the second membrane hollow-fiber chain 2. These cavities 16 are closed with stoppers 21 at the end 13 of the second membrane hollow-fiber chain 2. The treated fluid stream 17 leaves the second membrane hollow-fiber chain 2 via its open end 12. In FIG. 4, the layers 18 can also be formed by membrane hollow-fiber chains 1 and the layers 19 by membrane hollow-fiber chains 2. The same holds true for FIGS. 5, 7, and 8.

What is claimed is:

1. An apparatus for substance-specific treatment of a fluid comprising:
    a) a housing,
    b) an inlet arrangement, connected to a distribution space, for introducing the fluid to be treated into the housing,
    c) an outlet arrangement, connected to a collection space, for removing the treated fluid from the housing,
    d) an arrangement of first hollow-fiber membranes, and second hollow-fiber membranes, whereby the first and second hollow-fiber membranes in the arrangement are substantially parallel to each other and each of the hollow-fiber membranes respectively have an end facing the distribution space and an end facing the collection space, whereby the first hollow-fiber membranes have cavities formed by their walls, open in the direction of the distribution space and closed in the direction of the collection space, and at least at the respective end facing the distribution space are embedded in a sealing compound that is joined in a fluid-tight manner with a wall of the housing, and whereby the second hollow-fiber membranes have cavities formed by their walls, open in the direction of the collection space and closed in the direction of the distribution space, and at least at the respective end facing the collection space are embedded in a sealing compound that is joined in a fluid-tight manner to the wall of the housing, wherein the first hollow-fiber membranes are arranged in at least one flat first layer of adjacent first hollow-fiber membranes and the second hollow-fiber membranes are arranged in at least one flat second layer (19) of adjacent second hollow-fiber membranes, wherein each first layer is adjacent on at least one of its sides, over substantially the entire extent of its surface, to a second layer, and each second layer is adjacent on at least one of its sides, over substantially the entire extent of its surface, to a first layer, wherein the first and second layers have substantially the same thickness, wherein the housing contains a matrix on and/or in which substance-specific groups acting in a substance-specific manner are immobilized, and the filling ratio $\epsilon$ of the housing is greater than 0.55.

2. The apparatus according to claim 1, wherein the hollow-fiber membranes in the layers lie next to each other in a plane.

3. The apparatus according to claim 1, wherein it contains at least three layers.

4. The apparatus according to claim 1, wherein the first and second hollow-fiber membranes are incorporated into at least one hollow fiber mat respectively.

5. The apparatus according to claim 4, wherein the hollow-fiber membranes are incorporated into the respective hollow-fiber mat using textile threads.

6. The apparatus to claim 4, wherein the at least one hollow-fiber mat is a woven mat.

7. The apparatus according to claim 4, wherein the at least one hollow-fiber mat is a knitted mat.

8. The apparatus according to claim 4, wherein the hollow-fiber membranes are incorporated into the respective hollow-fiber mat using strip-form connecting elements.

9. The apparatus according to claim 4, wherein the hollow-fiber mats have a transverse elongation less than one per cent when the mat is subjected to a transverse stress of 12 cN per cm of mat width.

10. The apparatus according to claim 1, wherein the arrangement consists of flat first layers and flat second layers that are superimposed to form a stack.

11. The apparatus according to claim 1, wherein the arrangement consists of superimposed hollow-fiber mats that each contain first or second hollow-fiber membranes, and the hollow-fiber mats are folded jointly in a zigzag manner to form a stack.

12. The apparatus according to claim 1, wherein the arrangement consists of first and second layers that are wound spirally around a winding axis substantially parallel to the hollow-fiber membranes.

13. The apparatus according to claim 1, wherein the arrangement has an alternating sequence of first and second layers.

14. The apparatus according to claim 1, wherein the arrangement is made from a sequence of equal groups, each containing three superimposed layers, whereby each group is symmetrical with respect to the first and second layers within said group.

15. The apparatus according to claim 1, wherein the first and/or second hollow-fiber membranes serve as a matrix for the groups acting in a substance-specific manner.

16. The apparatus according to claim 1, wherein fluid-permeable carrier materials are inserted between the first and second layers and serve as a matrix for the groups acting in a substance-specific manner.

17. The apparatus according to claim 16, wherein the carrier materials are semi-permeable porous flat membranes.

18. The apparatus according to claim 16, wherein the carrier materials are particles.

19. The apparatus according to claim 16, wherein the first and second hollow-fiber membranes and the carrier materials serve as the matrix for the groups acting in a substance-specific manner.

20. The apparatus according to claim 19, wherein the matrix has different groups acting in a substance-specific manner.

21. The apparatus according to claim 1, wherein the hollow-fiber membranes have a ratio $V_w/V_m$ of the volume of their walls $V_w$ to the volume $V_m$ comprising the volume of their walls $V_w$ and the volume $V_c$ of their cavity between 0.4 and 0.9, where $V_w$, $V_c$, and $V_m$ refer to the wall, cavity and total volumes, respectively, of an individual hollow-fiber membrane.

22. The apparatus according to claim 1, wherein the filling ratio $\epsilon$ is greater than 0.7.

23. The apparatus according to claim 1, wherein the membranes contained in the housing have a mean pore diameter between 0.01 $\mu$m and 10 $\mu$m.

24. The apparatus according to claim 23, wherein the membranes have a mean pore diameter between 0.1 $\mu$m and 3 $\mu$m.

25. The apparatus according to claim 1, wherein the membranes contained in the housing have a mean porosity between 50% and 90% by volume.

26. The apparatus according to claim 1, wherein the membranes contained in the housing have a BET surface area between 2 and 300 m$^2$ per cm$^3$ of membrane volume.

27. The apparatus according to claim 26, wherein the membranes have a BET surface area between 4 and 30 m$^2$ per cm$^3$ of membrane volume.

28. The apparatus according to claim 1, wherein the membranes contained in the housing have a substantially isotropic structure.

29. The apparatus according to claim 20, wherein the first and second membranes and the carrier materials contained in the housing are made from cellulose, polyamide, polytetrafluoroethylene, or polyvinylidene fluoride, or modifications, blends, mixtures, or copolymers thereof.

30. The apparatus according to claim 1, wherein the groups acting in a substance-specific manner are ligands for affinity separation of ligates from a liquid to be treated.

31. The apparatus according to claim 30, wherein the ligands are coupled to the matrix via molecules of long-chain linear polymers, whereby the molecules of the long-chain linear polymers carry a plurality of ligands.

32. The apparatus according to claim 1, wherein the groups acting in a substance-specific manner are catalysts.

33. A process for substance-specific treatment of a fluid, using an apparatus according to claim 1, the process comprising at least the following steps:
  a) introducing the fluid to be treated via the inlet arrangement into the distribution space in the housing, the distribution space connected to the inlet arrangement,
  b) passing of the fluid from there into the cavities of the first hollow-fiber membranes and through the walls of the first hollow-fiber membranes,
  c) passing of the fluid out of the walls of the first hollow-fiber membranes,
  d) passing of the fluid into and through the walls of second hollow-fiber membranes,
  e) passing of the fluid out of the walls of the second hollow-fiber membranes into their cavities,
  f) passing of the fluid into the collection space, and,
  g) removing the fluid from the housing via the outlet arrangement,
  whereby the fluid on the way from the distribution space to the collection space flows through the matrix on and/or in which groups acting in a substance-specific manner are immobilized, and whereby at least one substance-specific treatment of the fluid takes place as it passes through the matrix.

34. The process according to claim 33, wherein the fluid to be treated in flowing through the matrix is successively subjected to at least two different substance-specific treatments.

35. The process according to claim 33, in that wherein the fluid to be treated is recirculated.

36. The process according to claim 33 conducted for cleaning/separation of ligates from a ligate-containing liquid by affinity, wherein the matrix is used on and/or in which ligands for the ligates are immobilized.

37. The process according to claim 33 conducted for catalytic treatment of fluids, characterized in that the matrix is used on and/or in which catalysts are immobilized.

* * * * *

UNITED STATES PATENT AND TRADEMARK OFFICE
CERTIFICATE OF CORRECTION

| | | |
|---|---|---|
| PATENT NO. | : 6,214,232 B1 | Page 1 of 1 |
| DATED | : April 10, 2001 | |
| INVENTOR(S) | : Ulrich Baurmeister and Rudolf Wollbeck | |

It is certified that error appears in the above-identified patent and that said Letters Patent is hereby corrected as shown below:

Column 1,

Signed and Sealed this

Twenty-second Day of March, 2005

JON W. DUDAS
*Director of the United States Patent and Trademark Office*

UNITED STATES PATENT AND TRADEMARK OFFICE
CERTIFICATE OF CORRECTION

PATENT NO. : 6,214,232 B1
DATED : April 10, 2001
INVENTOR(S) : Ulrich Baurmeister and Rudolf Wollbeck It is certified that error appears in the above-identified patent and that said Letters Patent is hereby corrected as shown below:

Column 1,
Line 9, after "housing" insert -- , --.

Column 10,
Line 65, change "da" to -- d --.

Column 14,
Line 12, change "da=4Aa/Ca" to -- da=4*Aa/Ca --.

Column 22,
Line 24, change "Apparatus" to -- apparatus --.

Column 23,
Line 45, after "apparatus" insert -- according --.

Signed and Sealed this

Twenty-second Day of March, 2005

JON W. DUDAS
*Director of the United States Patent and Trademark Office*

UNITED STATES PATENT AND TRADEMARK OFFICE
CERTIFICATE OF CORRECTION

PATENT NO. : 6,214,232 B2
DATED : April 10, 2001
INVENTOR(S) : Ulrich Baurmeister and Rudolf Wollbeck It is certified that error appears in the above-identified patent and that said Letters Patent is hereby corrected as shown below:

Column 1,
Line 9, after "housing" insert -- , --.

Column 10,
Line 65, change "da" to -- $d_a$ --.

Column 14,
Line 12, change "$d_a=4A_a/C_a$" to -- $d_a=4*A_a/C_a$ --.

Column 22,
Line 24, change "Apparatus" to -- apparatus --.

Column 23,
Line 45, after "apparatus" insert -- according --.

Signed and Sealed this

Twenty-sixth Day of April, 2005

JON W. DUDAS
*Director of the United States Patent and Trademark Office*

UNITED STATES PATENT AND TRADEMARK OFFICE
CERTIFICATE OF CORRECTION

PATENT NO.    : 6,214,232 B1
DATED         : April 10, 2001
INVENTOR(S)   : Ulrich Baurmeister et al.

It is certified that error appears in the above-identified patent and that said Letters Patent is hereby corrected as shown below:

Title page,
Item [73], Assignee, should read -- Akzo Nobel NV, Arnhem, (NL) --

Signed and Sealed this

Sixteenth Day of August, 2005

JON W. DUDAS
*Director of the United States Patent and Trademark Office*